(12) United States Patent
Goldberg et al.

(10) Patent No.: US 9,996,545 B1
(45) Date of Patent: *Jun. 12, 2018

(54) ANALYTICS AND DEDUPLICATION FOR AIR-GAPPED LOG ANALYSIS

(71) Applicant: International Business Machines Corporation, Armonk, NY (US)

(72) Inventors: Itzhack Goldberg, Hadera (IL); Harry R. McGregor, Tucson, AZ (US); Christopher B. Moore, Vail, AZ (US); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/697,897

(22) Filed: Sep. 7, 2017

Related U.S. Application Data

(63) Continuation of application No. 15/420,855, filed on Jan. 31, 2017.

(51) Int. Cl.
*G06F 17/00* (2006.01)
*G06F 17/30* (2006.01)
(Continued)

(52) U.S. Cl.
CPC .. *G06F 17/30156* (2013.01); *G06F 17/30253* (2013.01); *G06K 7/1404* (2013.01);
(Continued)

(58) Field of Classification Search
CPC ......... G06F 17/30156; G06F 17/30253; G06F 21/602; G06K 7/1404; G06K 19/06009; G06K 2209/01
(Continued)

(56) References Cited

U.S. PATENT DOCUMENTS

| 8,108,343 | B2 | 1/2012 | Wang et al. |
| 8,488,916 | B2 * | 7/2013 | Terman .................. G09B 5/08 382/187 |

(Continued)

FOREIGN PATENT DOCUMENTS

WO    2010033962 A1    3/2010

OTHER PUBLICATIONS

Nam et al., "Reliability-Aware Deduplication Storage: Assuring Chunk Reliability and Chunk Loss Severity," IGCC '11 Proceedings of the 2011 International Green Computing Conference and Workshops, Jul. 25-28, 2011, 6 pages, IEEE © 2011.

(Continued)

*Primary Examiner* — Karl D Frech
(74) *Attorney, Agent, or Firm* — Nathan M. Rau

(57) ABSTRACT

A system and method for deduplicating analyzing system logs is disclosed. The method includes capturing, by an image acquisition component, an image of at least one log entry, converting, by an image processing component, text in the image of the at least one log entry to machine-encoded text, and scanning, by a log scanning component, the machine-encoded text for the at least one redundant copy of the at least one log entry. The method also includes removing, by the log scanning component, the at least one redundant copy of the at least one log entry, determining, by a log analysis component, if the at least one log entry is significant, flagging the at least one log entry if the log entry is significant, and alerting a user if the log entry is flagged.

1 Claim, 4 Drawing Sheets

(51) Int. Cl.
   *G06K 19/06* (2006.01)
   *G06K 7/14* (2006.01)
   *G06F 21/60* (2013.01)

(52) U.S. Cl.
   CPC ...... *G06K 19/06009* (2013.01); *G06F 21/602* (2013.01); *G06K 2209/01* (2013.01)

(58) Field of Classification Search
   USPC .................................................. 235/375, 376
   See application file for complete search history.

(56) References Cited

U.S. PATENT DOCUMENTS

| | | |
|---|---|---|
| 8,564,818 B2 | 10/2013 | Nakamura |
| 9,122,694 B1 | 9/2015 | Dukes et al. |
| 9,170,748 B2 | 10/2015 | Ramesh et al. |
| 9,280,397 B2 * | 3/2016 | Adl-Tabatabai ........ G06F 8/458 |
| 2013/0227352 A1 | 8/2013 | Kumarasamy et al. |
| 2016/0085452 A1 | 3/2016 | Dukes et al. |

OTHER PUBLICATIONS

Goldberg et al., "Analytics and Deduplication for Air-Gapped Log Analysis," U.S. Appl. 15/420,855, filed Jan. 31, 2017.
List of IBM Patents or Patent Applications Treated as Related, Signed Sep. 7, 2017, 2 pages.

* cited by examiner

ANALYTICS AND DEDUPLICATION FOR AIR-GAPPED LOG ANALYSIS

BACKGROUND

The present disclosure relates to data analytics and, more specifically, to deduplication of air-gapped system logs.

Technical support for users' computer systems can be provided when system logs are relayed to a technical support group. Information in the user's system logs can allow the technical support group to identify problems that the system may be experiencing, allowing the support group to provide solutions to these problems. In some cases, the transmission of the system logs from the user to the technical support group is automatic. In other cases, a user may determine whether to send logs to a technical support group. However, these solutions do not work on air-gapped systems, which are physically separated from other networks, because the user does not have a network connection to the support group.

SUMMARY

Various embodiments are directed to a method for deduplicating and analyzing system logs. An image of a user's system logs can be captured by an image acquisition component. The image can also be encrypted by the image acquisition component. Text of system log entries in the image can be converted to machine-encoded text by an image processing component. The machine-encoded text of the log entries can additionally be encrypted by the image processing component. A log scanning component can scan the machine-encoded text of the log entries and remove redundant copes of a log entry. Additionally, a log analysis component in the log processing device or the text processing device can scan the log entries and determine whether a log entry is significant. If the log entry is significant, it can be flagged, and the user can be alerted.

DETAILED DESCRIPTION

System logs are records of various events that take place in a computer system, and these events can be related to problems with the system. Sharing log entries related to problems in a system with a technical support group can help the support group diagnose and solve the problem. However, sharing log entries becomes more complicated when a user has an air-gapped system (e.g., one that is physically separated from other networks). If the system cannot connect to the technical support group via a network, alternative means of transmitting log entries to the group must be employed.

According to some embodiments of the present disclosure, a user with an air-gapped system collects system log entries, and sends the entries to a technical support group without connecting the air-gapped system to a network. The user's system logs, visible on a console display, can be recorded as photographic images by a device that is not connected to the system. Photographic images of the log entries can also be collected as screenshots and transferred to a device that is not connected to the system via air-gapped transfer methods. Text in the photographic images of the logs can be converted to machine-encoded text, stored, and analyzed in the same device or in another device. The system logs can additionally be deduplicated, and displayed to a user. The user may have sensitive information in their system logs that they do not wish to share with a technical support group. If so, the user can sanitize the logs so that log entries containing sensitive information are removed. The user can select which logs will be sent to a technical support group, and send the logs without using a network connection between their system and the system of the technical support group.

Figure 1:
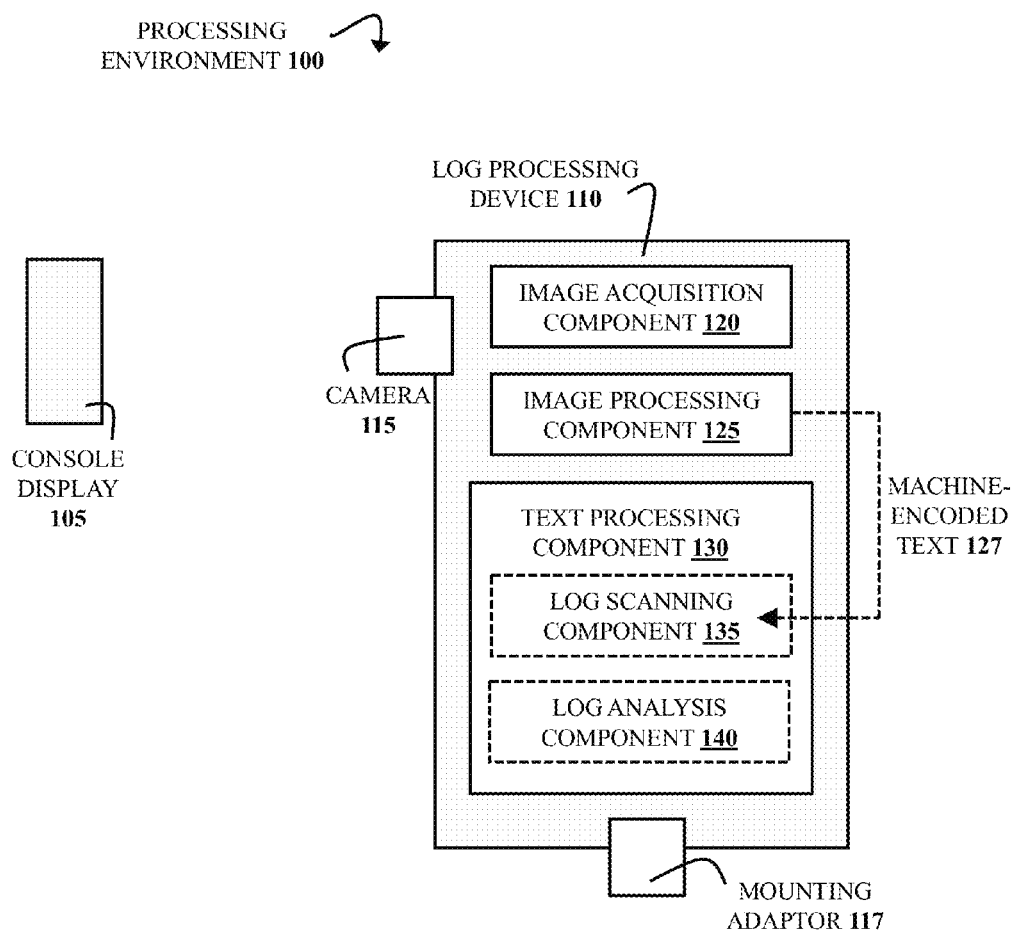
FIG. 1 is a block diagram illustrating a first system log processing environment, according to embodiments of the present disclosure.

FIG. 1 is a block diagram illustrating a first system log processing environment 100, according to some embodiments. Environment 100 includes a console display 105 and a log processing device 110. The log processing device 110 includes a camera 115, a mounting adaptor 117, an image acquisition component 120, an image processing component 125, and a text processing component 130. The text processing component includes a log scanning component 135 and a log analysis component 140. Though FIG. 1 illustrates the camera 115, mounting adaptor 117, image acquisition component 120, image processing component 125, and text processing component 130 as belonging to one device 110, multiple devices can be involved in other embodiments. An example of a processing environment 200 that includes multiple devices is discussed in greater detail with respect to FIG. 2.

The console display 105 illustrated in FIG. 1, can be any display that shows a user's system logs. In some embodiments, the console display 105 is a non-cathode ray tube (non-CRT) display. Examples of non-CRT displays can include plasma displays, liquid crystal displays (LCDs), light-emitting diode (LED) displays, etc. System log entries can be records of system events, changes, operations, etc. The log entries can contain information about a problem with the system, and analyzing the logs can help a user or technical support group determine the best solution to the problem. In some instances, a system can produce redundant log entries. For example, a log entry may be repeated many times if it records a significant event or problem with the system.

An image of the user's system logs is captured from the console display 105 by the log processing device 110 as a photographic image, such as a video or a still image. However, other means of capture can be used. For example, the image can be captured by another device, and transferred to the log processing device 110. The log processing device 110 also converts text in the captured image to machine-encoded text 127, and the log processing device 110 processes the text, as discussed below. The log processing device 110 can utilize the camera 115, the mounting adaptor 117, and the image acquisition component 120 to capture a photographic image. In some embodiments, the camera 115 can be included within the log processing device 110, and, in other embodiments, the camera 115 can be externally connected to the device 110. With the mounting adaptor 117, the log processing device 110 can be positioned at a distance from the console display 105 that allows the camera 115 to capture videos and/or still images of log entry text with sufficient focus so that the log entry can be analyzed. In other embodiments, the log processing device 110 and the camera 115 can be positioned without employing the mounting adaptor 117.

The image acquisition component 120 in the log processing device 110 facilitates transmission of the system log image from the camera 115 into the log processing device 110. In some embodiments, the image acquisition component 120 encrypts images that are to be stored on the device 110. The encryption can protect the security of the images in situations where the log processing device 110 is compromised. In some embodiments, visual secret sharing encryption is used. However, any type of encryption can be employed.

Text in the photographic image is converted to machine-encoded text 127 by the image processing component 125. One approach to this conversion is by optical character recognition (OCR), which is a method of recognizing printed characters, though any method of converting printed characters to machine encoded text can be used. OCR converts the printed characters in the photographic image of the system log to machine-encoded text 127 using photoelectric devices and computer software. The image processing component 125 can additionally encrypt the machine-encoded text 127 so that it cannot be read if the log processing device 110 is compromised.

Text in the images captured by the image acquisition component 120 can be processed in real-time, or the images can be stored for later analysis. In some embodiments, images of the log system text can be captured from screenshots, rather than the camera 115, and transferred to the log processing device 110 via other air-gapped file transfer methods. Examples of these methods include transfer using removable storage devices such as USB devices, flash memory cards, external hard drives, optical disks, magnetic tape, etc. in read only mode.

The log processing device 110 also includes a text processing component 130, which scans and analyzes the machine-encoded text 127 generated by the image processing component 125. The text processing component 130 comprises a log scanning component 135 and a log analysis component 140, which are discussed in greater detail below.

Machine-encoded system log text 127 produced by the image processing component 125 is monitored by the log scanning component 135. The log scanning component 135 determines whether there are redundant copies of log entries, and deduplicates the system logs by removing the redundant log entries. The log scanning component 135 determines whether log entries are duplicates of one another by comparing the machine-encoded text 127 of the entries. For example, the log scanning component 135 can detect duplicates when log entries each contain some or all of the same words. The log scanning component 135 can scan the complete machine-encoded text 127 of a log for matching words and phrases, or it can scan portions of the text. In some instances, the log scanning component 135 can detect that logs are duplicates if they each contain certain predefined keywords. For example, the log scanning component 140 can determine that logs are duplicates if each log contains the same error message.

In some embodiments, all redundant copies of log entries are removed during deduplication. However, in other embodiments, a portion of the redundant copies of log entries are removed. Instructions directing the extent of deduplication can be input by a user or organization. For example, a user may specify that log entries should be deduplicated when the number of log entries surpasses a threshold number. The portion size can be any number of system log copies, and the number can be preprogrammed or specified by the user. Additionally, instructions could specify that log entries recorded at particular times be deduplicated. The log scanning component 135 can additionally record the time span of deduplication and the quantity of redundant log entries that are removed. If the log scanning component 135 records that a log entry has a number of redundant copies that surpasses a threshold number of copies over a designated time span, this log entry may be considered significant or in some way indicative of a problem with the system. One example of a threshold number and time span is 1,000 redundant copies of a log entry in one hour, though other threshold numbers and time spans can be used.

Determination of the significance of a log entry is carried out by the log analysis component 140. If the log analysis component 140 detects a log entry that may be significant, it flags the entry. In some cases, a log entry can be flagged when the log scanning component 135 detects many copies of it and/or its repetition over a long time span (e.g., at least one copy detected every hour for more than eight hours). There may also be cases in which a user designates certain types of log entry as significant (e.g., log entries that record system errors, scheduled updates, input from external devices, etc.). The log analysis component 140 can detect and flag these significant log entries. When a log entry is flagged, an alert can be sent to a user. In some cases, a flag can indicate that a problem in the system has been detected. Additionally, in some embodiments, user-input settings can instruct the log scanning component 135 to refrain from deduplicating all or a portion of log entries that are considered significant.

If the user is alerted to the presence of a significant log entry, the user can examine the deduplicated system logs and decide what, if any, actions to take. In some embodiments, the user is alerted by sounds, pop-up messages, emails, short message service ('SMS' or text) messages, flashing lights, force or haptic feedback, electric impulses, etc. If a flagged log entry reports a problem in the system, the user may implement a solution, or send the entry to a technical support group. Sending the log entry to a support group, such as the system vendor's technical support group, allows the group to diagnose the problem, and offer improvements to the system. Before sending log entries to a technical support group, the user can sanitize the logs. This can allow the user to eliminate sensitive information, and send only non-sensitive, relevant, or necessary log entries to the technical support group. In other embodiments, if the log analysis component 140 detects a sensitive log entry, it can automatically sanitize the entry. In some examples, the log analysis component 140 can analyze the machine encoded text 127 as it is generated, while creating an additional document for the automatically sanitized logs. The log analysis component 140 can keep a record of this automatic sanitization for the user's review, and it can optionally alert the user.

Figure 2:
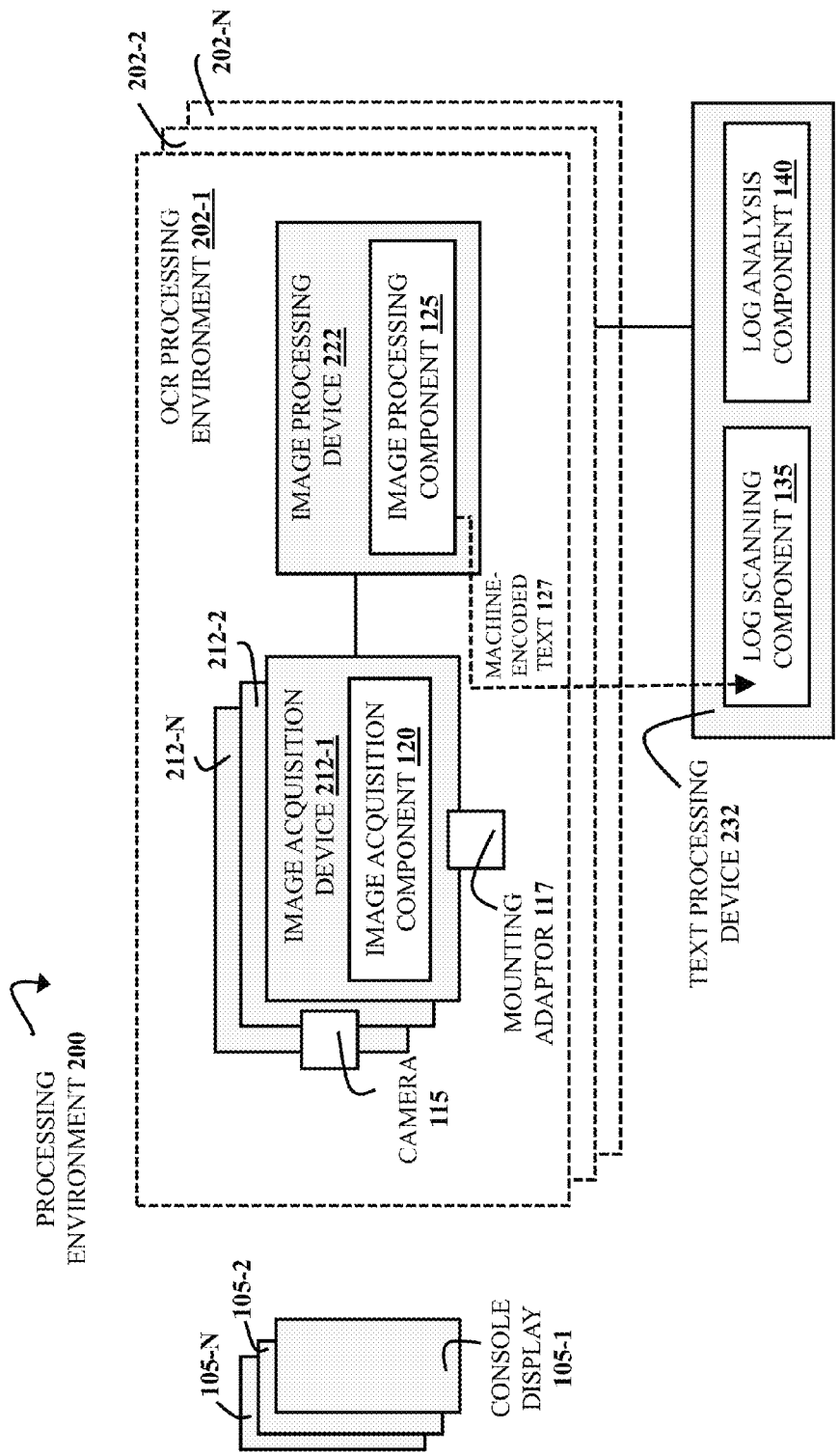
FIG. 2 is a block diagram illustrating a second system log processing environment, according to embodiments of the present disclosure.

FIG. 2 is a block diagram illustrating a second system log processing environment 200, according to some embodiments. The same processes can be carried out in processing environment 200 as in processing environment 100. However, in processing environment 200, the image acquisition component 120, image processing component 125, and text processing component 130 are not contained in a single device. Rather, the system includes at least one image acquisition device 212-1, 212-2, 212-N, (collectively 212), an image processing device 222, and a text processing device 232. Processing environment 200 also includes at least one console display 105-1, 105-2, 105-N, (collectively 105).

The components of processing environment 200 are arranged so that the image acquisition device 212 and the image processing device 222 together form an optical character recognition (OCR) processing environment. There is at least one OCR processing environment 202-1, 202-2, 202-N, (collectively 202), and each OCR processing environment 202 is connected to a central text processing device 232. Though not illustrated in FIG. 2, in some embodiments, there can be more than one text processing device 232. The OCR processing environment 202 is illustrated as containing one image processing device 222 and at least one image acquisition device 212, but other arrangements are possible. For example, in some embodiments, the OCR processing environment 202 can have more than one image processing device 222. There may also be instances in which a user has more than one console display 105, and each console display 105 is paired with an OCR processing environment 202.

The image acquisition device 212 includes an image acquisition component 120, a camera 115, and a mounting adaptor 117. These components are discussed in greater detail with respect to FIG. 1. Though FIG. 2 illustrates one camera 115, each image acquisition device 212 can include a camera 115. One or more image acquisition devices 212 collect images of system logs from the console display 105, and transfer the images to the image processing device 222. The image processing device 222 contains the image processing component 125, which converts system log text in the images to machine-encoded text 127, as discussed with respect to FIG. 1.

Machine-encoded text 127 of the system logs produced by the image processing device 222 is transferred from the OCR processing environment 202 to the text processing device 232. In some embodiments, multiple OCR processing environments 202 send the machine-encoded text 127 of log entries to a central text processing device 232. The text processing device 232 includes a log scanning component 135 and a log analysis component 140, which monitor, deduplicate, analyze, and flag system logs.

Figure 3:
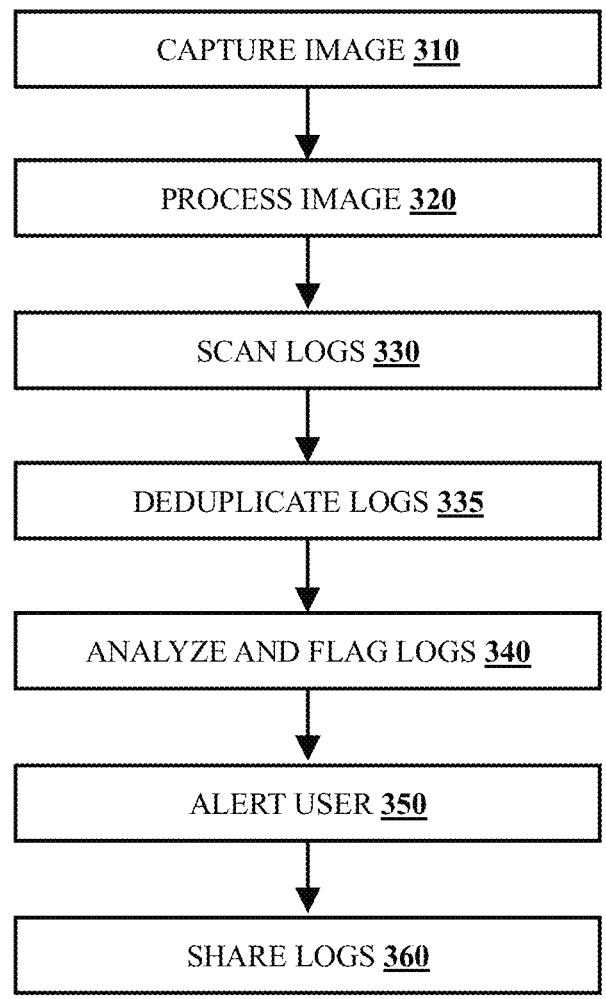
FIG. 3 is a flowchart illustrating a process of system log deduplication and analysis, according to embodiments of the present disclosure.

FIG. 3 is a flow diagram illustrating a process 300 of system log collection, deduplication, and analysis, according to some embodiments. In operation 310, photographic images of log entries from the user's system are captured as they appear on a console display 105. The image collection can occur continuously or at user-specified times. The photographic images can be still images or videos, and they can be collected by the log processing device 110 or the image acquisition device 212. In this example, the log processing device 110 and the image acquisition device 212 each employ the camera 115, image acquisition component 120, and mounting adaptor 117 to capture the images.

Photographic images of the system log entries collected by the log processing device 110 or the image acquisition device 212 in operation 310 are processed in operation 320, producing machine-encoded text 127 of the log entries. The processing operation 320 is carried out by the image processing component 120. As discussed in greater detail with respect to FIG. 1, the image processing component 125 converts the images of system log text into machine-encoded text 127.

The machine-encoded text 127 produced by the image processing component 120 in operation 320 is scanned in operation 330. The log scanning operation 330 determines whether there are redundant copies of system logs. The log scanning operation 330 is carried out by the log scanning component 135, and it can occur continuously as images appear or at user-specified times. Additionally, the system logs can be scanned in real-time, or they can be stored, and scanned at another time. The log scanning component 135 can be in the text processing device 232 or the log processing device 110. Additionally, the log scanning component 135 can record the number of copies of a log entry, as well as the time period in which the copies appeared.

If the log scanning component 135 locates redundant copies of a log entry, the log scanning component 135 deduplicates the system logs in operation 335. This step removes redundant copies of a log entry. As discussed in greater detail with respect to FIG. 1, the log scanning component can locate redundant copies by comparing the machine-encoded text 127 of multiple log entries, and locating matching portions. In some embodiments, all redundant copies can be removed, while, in other embodiments, a portion of the redundant copies can be removed. The extent of deduplication can be specified by user-input settings, and may depend on the content of the log entry.

The deduplicated system logs are analyzed by the log analysis component 140 in operation 340, and log entries that may be significant to a user are flagged. Whether the log entries are significant is determined by the log analysis component 140, which can be in the text processing device 232 or the log processing device 110. The log analysis component 140 can flag log entries that have been repeated in great quantities or over long time spans, as was discussed with respect to FIG. 1. These quantities and time spans can be designated by user-input and/or preprogrammed settings. In some cases, there can be a threshold number of log entries for a period of time. For example, a threshold can be set so that, if 50 or more copies of a log entry are produced in 30 minutes or less, the log entry is flagged. Further, in some embodiments, the log analysis component 140 can be configured to flag log entries that have features the user considers significant. For example, the user may consider log entries that report system errors to be significant, and program the log analysis component 140 to flag these log entries, regardless of the number of redundant copies.

The user is alerted to flagged log entries in operation 350. Examples of alerts can include sounds, pop-up messages, emails, short message service ('SMS' or text) messages, flashing lights, force or haptic feedback, electric impulses, etc. The same type of alert can be used for each flag, or different alerts can be used for different types of flags. For example, a pop-up message could be used when a log entry that the user has designated as important is flagged, and an email sent when a log entry is flagged because multiple copies of the log entry have been detected in a designated time span.

The user selects and shares flagged log entries in operation 360. In some embodiments, the user sends the selected log entries to a technical support group so that the group can diagnose the problem and offer a solution. However, the user may have sensitive information within the system logs that he or she does not want to share with the technical support group. If so, the user can examine and sanitize the deduplicated and flagged log entries before sending remaining log entries to the technical support group. Additionally, in some cases, the user can implement a solution to a system error that resulted in a flagged log entry without sending the log entries to the technical support group.

Figure 4:
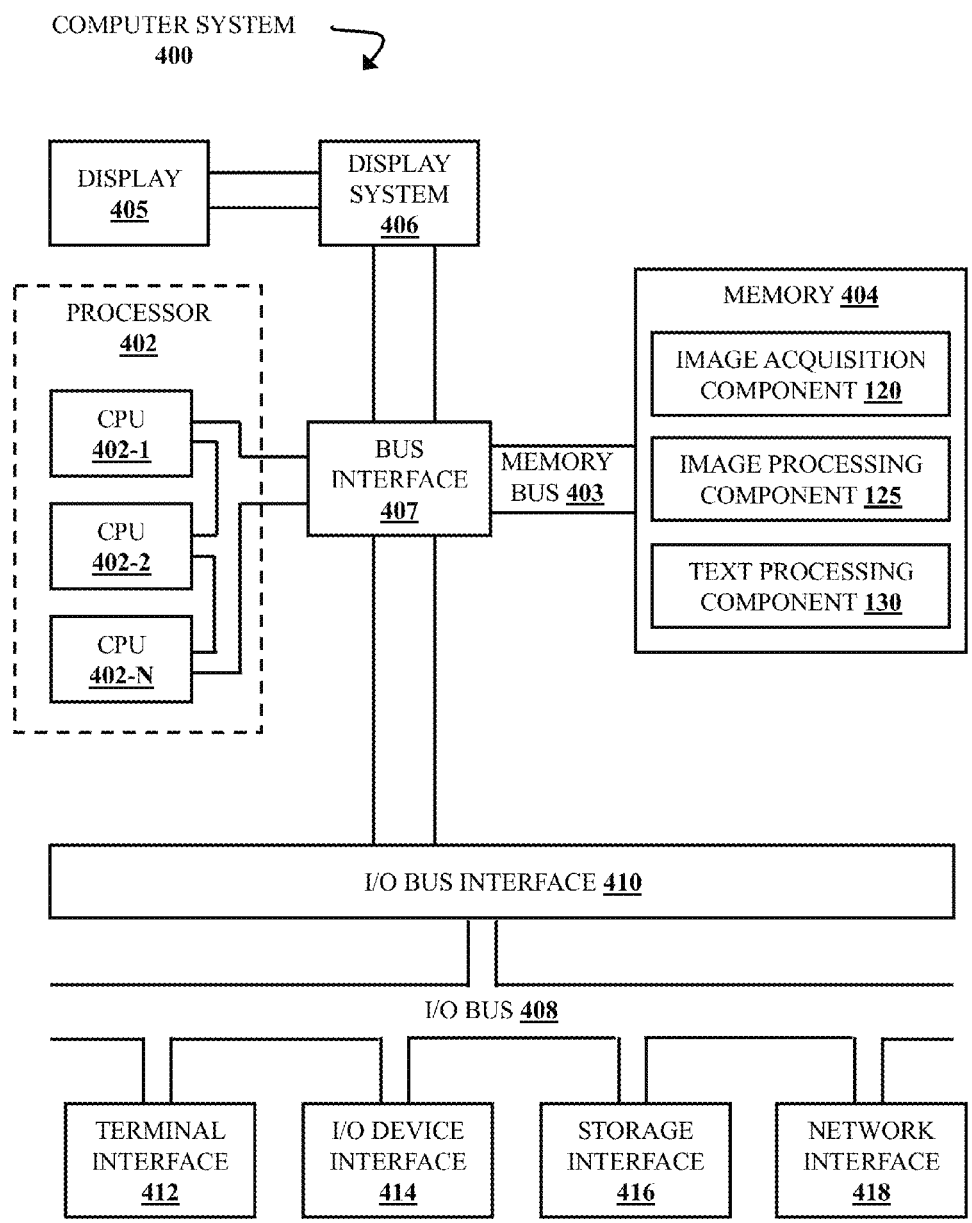
FIG. 4 illustrates a computer system, according to embodiments of the present disclosure.

FIG. 4 shows a high-level block diagram of an example computer system 400 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory subsystem 404, a terminal interface 412, a storage interface 416, an I/O (input/output) device interface 414, and a network interface 418. These components may be communicatively coupled, directly or indirectly, for inter-component communication via a memory bus 403, an I/O bus 408, bus interface unit 407, and an I/O bus interface unit 410. The computer system 400 can also be connected to an internal or external camera 115. In some cases, camera 115 can be connected to the computer system 400 by the I/O device interface 414.

The computer system 400 may contain one or more general-purpose programmable central processing units (CPUs) 402-1, 402-2, and 402-N, herein generically referred to as the CPU 402. In some embodiments, the computer system 400 may contain multiple processors typical of a relatively large system; however, in other embodiments the computer system 400 may alternatively be a single CPU system. Each CPU 402 may execute instructions stored in the memory subsystem 404 and may include one or more levels of on-board cache.

The memory 404 may include a random-access semiconductor memory, storage device, or storage medium (either volatile or non-volatile) for storing or encoding data and programs. In some embodiments, the memory 404 represents the entire virtual memory of the computer system 400, and may also include the virtual memory of other computer systems coupled to the computer system 400 or connected via a network. The memory 404 is conceptually a single monolithic entity, but, in other embodiments, the memory 404 is a more complex arrangement, such as a hierarchy of caches and other memory devices. For example, memory may be in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. The memory 404 may store all or a portion of the following: an image acquisition component 120, an image processing component 125, and a text processing component 130. The text processing component 130 can include the log scanning component 135 and the log analysis component 140, though these are not illustrated in FIG. 4. Components 120, 125, 130, 135, and 140 were discussed in greater detail with respect to FIG. 1.

While components 120, 125, and 130 are illustrated as being included within the memory 404 in the computer system 400, in other embodiments, some or all of these components may be on different computer systems, and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the image acquisition component 120, the image processing component 125, and the text processing component 130 are illustrated as being included within the memory 404, these components are not necessarily all completely contained in the same storage device at the same time. Further, although the image acquisition component 120, the image processing component 125, and the text processing component 130 are illustrated as being separate entities, in other embodiments some of these components, portions of some of these components, or all of these components may be packaged together.

In an embodiment, the image acquisition component 120, the image processing component 125, and the text processing component 130 include instructions that execute on the processor 402 or instructions that are interpreted by instructions that execute on the processor 402 to carry out the functions as further described in this disclosure. In another embodiment, the image acquisition component 120, the image processing component 125, and the text processing component 130 are implemented in hardware via semiconductor devices, chips, logical gates, circuits, circuit cards, and/or other physical hardware devices in lieu of, or in addition to, a processor-based system. In another embodiment, image acquisition component 120, image processing component 125, and text processing component 130 include data in addition to instructions or statements.

Although the memory bus 403 is shown in FIG. 4 as a single bus structure providing a direct communication path among the CPUs 402, the memory subsystem 404, the display system 406, the bus interface 407, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

The computer system 400 may include a bus interface unit 407 to handle communications among the processor 402, the memory 404, a display system 406, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 may be a multi-user mainframe computer system, a single-user system, or a server computer or similar device that has little or no direct user interface, but receives requests from other computer systems (clients). Further, in some embodiments, the computer system 400 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for deduplicating and analyzing system logs, comprising:
    capturing an image of at least one log entry, wherein the image of the at least one log entry is a still image;
    encrypting the image of the at least one log entry;
    converting text in the image of the at least one log entry to machine-encoded text;
    encrypting the machine-encoded text of the at least one log entry;
    scanning the machine-encoded text for at least one redundant copy of the at least one log entry;
    removing the at least one redundant copy of the at least one log entry;
    determining if the at least one log entry is significant, wherein the determining determines that the at least one log entry is significant if a number of the at least one redundant copy of the a least one log entry is greater than a threshold number of redundant copies of log entries in a designated time span;
    flagging the at least one log entry if the at least one log entry is significant; and
    alerting a user if the at least one log entry is flagged.

* * * * *